United States Patent
Nie et al.

(10) Patent No.: US 11,148,256 B2
(45) Date of Patent: *Oct. 19, 2021

(54) ABRASIVE WHEELS AND METHODS FOR MAKING AND USING SAME

(71) Applicants: SAINT-GOBAIN ABRASIVES, INC., Worcester, MA (US); SAINT-GOBAIN ABRASIVES, Conflans-Sainte Honorine (FR)

(72) Inventors: Dashi Nie, Shanghai (CN); Shenglan Huang, Shanghai (CN); Gaoxiang Gou, Shanghai (CN)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 777 days.

This patent is subject to a terminal disclaimer.

(21) Appl. No.: 15/840,293

(22) Filed: Dec. 13, 2017

(65) Prior Publication Data

US 2018/0099380 A1   Apr. 12, 2018

Related U.S. Application Data

(62) Division of application No. 14/418,301, filed as application No. PCT/US2013/052484 on Jul. 29, 2013, now Pat. No. 9,873,184.

(Continued)

(30) Foreign Application Priority Data

Jul. 31, 2012   (CN) .......................... 201210269821.6

(51) Int. Cl.
*B24D 5/12*   (2006.01)
*B24D 3/28*   (2006.01)
(Continued)

(52) U.S. Cl.
CPC ............... *B24D 5/123* (2013.01); *B24D 3/28* (2013.01); *B24D 5/12* (2013.01); *B24D 18/0009* (2013.01);
(Continued)

(58) Field of Classification Search
CPC . B24D 5/123; B24D 3/28; B24D 5/12; B24D 18/0009; C09K 3/1409; C09C 1/407
(Continued)

(56) References Cited

U.S. PATENT DOCUMENTS 5,611,828 A  *  3/1997   Celikkaya ........... C04B 35/1115
                                                                   51/293
5,641,330 A  *  6/1997   Celikkaya ........... C04B 35/1115
                                                                   51/293
(Continued)

FOREIGN PATENT DOCUMENTS

CN         85102067 A    1/1987
CN         1509842 A     7/2004
(Continued)

OTHER PUBLICATIONS

JB/T3629-1999. Common abrasive Black Fused Alumina. Chinese Standard. Abstract Only. 1 pg.
(Continued)

*Primary Examiner* — Michael D Jennings
*Assistant Examiner* — Abbie E Quann
(74) *Attorney, Agent, or Firm* — Abel Sehillinger, LLP; Joseph Sullivan

(57) ABSTRACT

A cutting wheel includes a body having a bond material. The bond material comprises at least about 31 vol % of a total volume of the body. Additionally, the body includes abrasive particles contained within the bond material. The abrasive particles include a first type of abrasive particle including black alumina with at least about 10 vol % of a total volume
(Continued)

of the abrasive particles including black alumina. In some instances the cutting wheel can include a chop saw, while in other situations, the cutting wheel can include a cut-off wheel.

20 Claims, 12 Drawing Sheets

Related U.S. Application Data

(60) Provisional application No. 61/724,473, filed on Nov. 9, 2012.

(51) Int. Cl.
 *C09C 1/40* (2006.01)
 *C09K 3/14* (2006.01)
 *B24D 18/00* (2006.01)

(52) U.S. Cl.
 CPC ............ *C09C 1/407* (2013.01); *C09K 3/1409* (2013.01); *C01P 2002/72* (2013.01); *C01P 2004/03* (2013.01); *C01P 2004/54* (2013.01); *C01P 2006/10* (2013.01)

(58) Field of Classification Search
 USPC .......................................... 451/544, 307–309
 See application file for complete search history.

(56) References Cited

U.S. PATENT DOCUMENTS

| | | | |
|---|---|---|---|
| 5,876,470 A | 3/1999 | Abrahamson | |
| 5,989,114 A * | 11/1999 | Donahue | B24D 7/14 |
| | | | 451/542 |
| 6,015,338 A | 1/2000 | Hong et al. | |
| 6,451,076 B1 | 9/2002 | Nevoret et al. | |
| 6,595,845 B1 | 7/2003 | Mizuno et al. | |
| 7,344,573 B2 | 3/2008 | Vecchiarelli et al. | |
| 7,381,466 B2 | 6/2008 | Zeiringer et al. | |
| 8,252,075 B2 | 8/2012 | Zuyev et al. | |
| 8,771,390 B2 | 7/2014 | Upadhyay et al. | |
| 9,022,840 B2 | 5/2015 | Dinh-Ngoc et al. | |
| 9,873,184 B2 * | 1/2018 | Nie | C09C 1/407 |
| 2003/0110707 A1 * | 6/2003 | Rosenflanz | C03B 32/02 |
| | | | 51/307 |
| 2005/0101225 A1 | 5/2005 | Bright et al. | |
| 2005/0132657 A1 * | 6/2005 | Celikkaya | B24D 18/00 |
| | | | 51/307 |
| 2005/0137077 A1 | 6/2005 | Bange et al. | |
| 2006/0211342 A1 | 9/2006 | Bonner et al. | |
| 2007/0010175 A1 | 1/2007 | Feng et al. | |
| 2007/0020457 A1 | 1/2007 | Adefris | |
| 2007/0084133 A1 | 4/2007 | Schwabel et al. | |
| 2012/0231711 A1 | 9/2012 | Keipert et al. | |
| 2013/0040537 A1 * | 2/2013 | Schwabel | B24D 5/04 |
| | | | 451/28 |
| 2013/0203328 A1 * | 8/2013 | Givot | B24D 5/04 |
| | | | 451/548 |
| 2014/0187129 A1 * | 7/2014 | Sivasubramanian | B24D 3/001 |
| | | | 451/541 |
| 2015/0267097 A1 * | 9/2015 | Rosenflanz | B24D 3/30 |
| | | | 451/28 |
| 2015/0375367 A1 * | 12/2015 | Sivasubramanian | B24D 3/28 |
| | | | 51/296 |
| 2016/0184974 A1 * | 6/2016 | Srihari | B24D 11/001 |
| | | | 451/466 |
| 2016/0193717 A1 * | 7/2016 | Culler | C04B 35/62807 |
| | | | 451/540 |

FOREIGN PATENT DOCUMENTS

| | | |
|---|---|---|
| CN | 101723651 A | 6/2010 |
| CN | 201573122 U | 9/2010 |
| CN | 201573123 U | 9/2010 |
| CN | 201573124 U | 9/2010 |
| CN | 201573125 U | 9/2010 |
| CN | 102119071 A | 7/2011 |
| CN | 102245352 A | 11/2011 |
| CN | 102341215 A | 2/2012 |
| CN | 102463530 A | 5/2012 |
| DE | 10257554 A1 | 7/2004 |
| EP | 2264115 A1 | 12/2010 |
| KR | 10-2007-0000734 A | 1/2007 |
| KR | 10-2001-0018496 A | 3/2011 |
| WO | 2011109188 A2 | 9/2011 |
| WO | 2012092610 A1 | 7/2012 |
| WO | 2014022270 A1 | 2/2014 |
| WO | 2014022278 A1 | 2/2014 |

OTHER PUBLICATIONS

GB 9257-1988. Chemical analysis methods of black fused alumina. Chinese Standard. Abstract Only. 1 pg.

* cited by examiner

ABRASIVE WHEELS AND METHODS FOR MAKING AND USING SAME

CROSS-REFERENCE TO RELATED APPLICATIONS

This application is a divisional of and claims priority to U.S. patent application Ser. No. 14/418,301, entitled "ABRASIVE WHEELS AND METHODS FOR MAKING AND USING SAME," by Dashi Nie et al., filed Jan. 29, 2015, which is a National Stage Application of International Application No. PCT/US13/52484, entitled "ABRASIVE WHEELS AND METHODS FOR MAKING AND USING SAME," by Dashi Nie et al., filed Jul. 29, 2013, which claims priority to Chinese Patent Application No. 201210269821.6, entitled "ABRASIVE WHEELS AND METHODS FOR MAKING AND USING SAME," by Dashi Nie et al., filed Jul. 31, 2012 and U.S. Provisional Application No. 61/724,473, entitled "ABRASIVE WHEELS AND METHODS FOR MAKING AND USING SAME," by Dashi Nie et al., filed Nov. 9, 2012, all of which are assigned to the current assignee hereof and incorporated herein by reference in their entireties.

BACKGROUND

Typically, bonded abrasive articles are prepared by blending abrasive particles with a bond and optional additives and shaping the resulting mixture by using, for instance, a suitable mold. The mixture can be shaped to form a green body which is thermally processed, for example, by curing, sintering and so forth, to produce an article in which the abrasive particles are held in a three dimensional bond matrix. In some cases, the green body can be cold processed to form the bonded abrasive article. Among bonded abrasive tools, abrasive wheels often are prepared for grinding, cutting, polishing, and the like. Such wheels can be reinforced using, for example, discs cut out of nylon, carbon, glass or cotton cloth, or they may not be reinforced.

SUMMARY

The disclosure generally relates to bonded abrasive articles and in particular to abrasive wheels suitable for use as a chop saw or cut-off wheel and to methods for producing such abrasive wheels.

In one aspect, the disclosure is directed to a cutting wheel comprising a body including a bond material. The bond material comprises at least about 31 vol % of a total volume of the body. Additionally, the body includes abrasive particles contained within the bond material. The abrasive particles include a first type of abrasive particle including black alumina with at least about 25 vol % of a total volume of the abrasive particles including black alumina. In some instances the cutting wheel can include a chop saw, while in other situations, the cutting wheel can include a cut-off wheel.

The above and other features described herein including various details of construction and combinations of parts, and other advantages, will now be more particularly described with reference to the accompanying drawings and pointed out in the claims. It will be understood that the particular method and article embody certain features that are shown by way of illustration and not as limitations and that the principles and features described herein may be employed in various and numerous embodiments.

BRIEF DESCRIPTION OF THE DRAWINGS

In the accompanying drawings, reference characters refer to the same parts throughout the different views. The drawings are not necessarily to scale.

DETAILED DESCRIPTION

Figure 1:
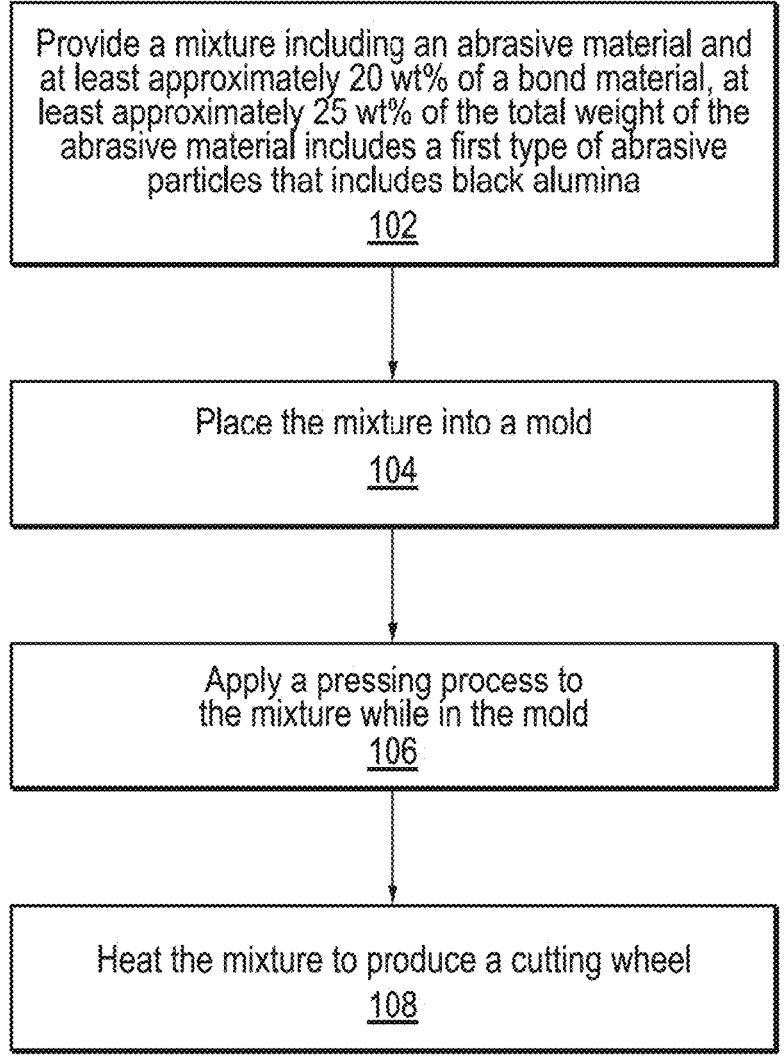
FIG. 1 includes a flow diagram of a method to make a cutting wheel according to one embodiment.

The disclosure generally relates to bonded abrasive articles, and in particular, to cutting wheels suitable for use as a cut-off wheel or a chop saw and to methods for producing the same. FIG. 1 includes a flow diagram of a method 100 to make a cutting wheel according to one embodiment. In particular, at 102, the method 100 includes providing a mixture including abrasive particles and a bond material. The mixture can also include additional components, such as processing aids, lubricants (e.g., wetting agents), curing agents, crosslinking agents, antistatic agents, a porosity inducer, coloring agents, and the like.

In an embodiment, the mixture may include at least about 53 wt % abrasive particles for a total weight of the mixture, at least about 59 wt % abrasive particles for a total weight of the mixture, or at least about 64 wt % abrasive particles for a total weight of the mixture. In another embodiment, the mixture includes no greater than about 79 wt % abrasive particles for a total weight of the mixture, no greater than about 73 wt % abrasive particles for a total weight of the mixture, or no greater than about 68 wt % abrasive particles for a total weight of the mixture. It will be appreciated that the content of abrasive particles in the mixture can be within a range between any of the values noted above. In a particular embodiment, the mixture can include abrasive particles within a range of about 64 wt % to about 73 wt % abrasive particles for a total weight of the mixture.

According to one aspect, the mixture can include more than one type of abrasive particle, where different types of abrasive particles can differ from each other based on hardness, toughness, composition, manufacturing process, and a combination thereof. In an embodiment, the abrasive particles can include a first type of abrasive particle. In a particular embodiment, at least about 25 wt % of a total weight of the abrasive particles includes the first type of abrasive particle. For example, in some instances, at least about 38 wt % of a total weight of the abrasive particles includes the first type of abrasive particle, at least about 47 wt % of a total weight of the abrasive particle includes the first type of abrasive particle, at least about 55 wt % of a total weight of the abrasive particles includes the first type of abrasive particle, at least about 62 wt % of a total weight of the abrasive particles includes the first type of abrasive particle, or at least about 67 wt % of a total weight of the abrasive particles includes the first type of abrasive particle. In additional embodiments, no greater than about 81 wt % of a total weight of the abrasive particles includes the first type of abrasive particle, no greater than about 76 wt % of a total weight of the abrasive particles include the first type of abrasive particle, or no greater than about 71 wt % of a total weight of the abrasive particles include the first type of abrasive particle. It will be appreciated that the content of the first type of abrasive particle can be within a range between any of the values noted above. In a particular illustrative embodiment, the total weight of the abrasive particles can include the first type of abrasive particle within a range of about 62 wt % to about 71 wt %.

In another embodiment, at least about 28 wt % of a total weight of the mixture includes the first type of abrasive particle, at least about 35 wt % of a total weight of the mixture includes the first type of abrasive particle, or at least about 43 wt % of a total weight of the mixture includes the first type of abrasive particle. Additionally, no greater than about 56 wt % of a total weight of the mixture includes the first type of abrasive particle, no greater than about 51 wt % of a total weight of the mixture includes the first type of abrasive particle, or no greater than about 46 wt % of a total weight of the mixture includes the first type of abrasive particle. It will be appreciated that the content of the first type of abrasive particle can be within a range between any of the values noted above.

In some embodiments, the first type of abrasive particle can have a density no greater than about 3.9 g/cm$^3$, no greater than about 3.8 g/cm$^3$, no greater than about 3.7 g/cm$^3$, or no greater than about 3.6 g/cm$^3$.

In certain instances, the first type of abrasive particle can have an average aspect ratio of no greater than about 5:1, no greater than about 3:1, no greater than about 2:1, or no greater than about 1:1.

In a particular embodiment, the first type of abrasive particle can include an oxide, such as alumina, and particularly, black alumina. For at least one embodiment, the first type of abrasive particle can consist essentially of black alumina. In one embodiment, the black alumina can include a number of phases, such as an alpha alumina phase within a range of about 68 vol % to about 92 vol % of a total volume of the black alumina. Additionally, the black alumina can include a (Fe, Al, Si)O$_4$ phase within a range of about 12 vol % to about 16 vol % of a total volume of the black alumina. Further, the black alumina can include a FeTiO$_3$ phase within a range of about 4 vol % to about 8 vol % of a total volume of the black alumina. In certain situations, the black alumina can include trace amounts of a SiO$_2$ phase.

In some embodiments, the black alumina can include Al$_2$O$_3$ within a range of about 60 vol % to about 76 vol % of a total volume of the black alumina. In addition, the black alumina can include Fe$_2$O$_3$ within a range of about 7 vol % to about 17 vol % of a total volume of the black alumina and SiO$_2$ within a range of about 10 vol % to about 20 vol % of a total volume of the black alumina. Furthermore, the black alumina can include TiO$_2$ within a range of about 2 vol % to about 4 vol % of a total volume of the black alumina.

In certain embodiments, the black alumina can have a Vickers Hardness within a range of about 1870 to about 2450. The Vickers Hardness can be measured according to the ASTM E384 standard at the time of filing this patent application.

In an embodiment, an average particle size of the first type of abrasive particle can be at least about 0.34 mm, at least about 0.45 mm, at least about 0.52 mm, or at least about 0.61 mm. In another embodiment, the average particle size of the first type of abrasive particle can be no greater than about 1.16 mm, no greater than about 1.03 mm, no greater than about 0.91 mm, or no greater than about 0.76 mm. It will be appreciated that the average particle size of the first type of abrasive particle can be within a range between any of the values noted above.

In certain embodiments, the mixture can include a second type of abrasive particle. In some aspects, at least about 14 wt % of a total weight of the abrasive particles includes the second type of abrasive particle, at least about 21 wt % of a total weight of the abrasive particles includes the second type of abrasive particle, or at least about 28 wt % of a total weight of the abrasive particles includes the second type of abrasive particle. In additional scenarios, no greater than about 39 wt % of a total weight of the abrasive particles includes the second type of abrasive particle, no greater than about 35 wt % of a total weight of the abrasive particles include the second type of abrasive particle, or no greater than about 33 wt % of a total weight of the abrasive particles include the second type of abrasive particle. It will be appreciated that the content of the second type of abrasive particle can be within a range between any of the values noted above. In a particular illustrative embodiment, the total weight of the abrasive particles can include the second type of abrasive particle within a range of about 28 wt % to about 35 wt %.

In another embodiment, at least about 11 wt % of a total weight of the mixture includes the second type of abrasive particle, at least about 17 wt % of a total weight of the mixture includes the second type of abrasive particle, or at least about 23 wt % of a total weight of the mixture includes the second type of abrasive particle. Additionally, no greater than about 34 wt % of a total weight of the mixture includes the second type of abrasive particle, no greater than about 28 wt % of a total weight of the mixture includes the second type of abrasive particle, or no greater than about 24 wt % of a total weight of the mixture includes the second type of abrasive particle. It will be appreciated that the content of the second type of abrasive particle in the mixture can be within a range between any of the values noted above.

In some embodiments, the second type of abrasive particle can have a density of at least about 3.5 g/cm³, at least about 3.6 g/cm³, at least about 3.7 g/cm³, or at least about 3.8 g/cm³.

In certain instances, the second type of abrasive particle can have an average aspect ratio of no greater than about 5:1, no greater than about 3:1, no greater than about 2:1, or no greater than about 1:1.

In an embodiment, the first type of abrasive particle can have an average first particle size and the second type of abrasive particle can have an average second particle size. In an additional embodiment, the average first particle size can be within about 10% of the average second particle size, within about 20% of the average second particle size, within about 30% of the average second particle size, within about 40% of the average second particle size, within about 50% of the average second particle size, within about 60% of the average second particle size, within about 70% of the average second particle size, within about 80% of the average second particle size, or within about 90% of the average second particle size. The relationship between the average particle size of the first type of abrasive particle and the average particle size of the second type of abrasive particle can be calculated based on the equation $((Pt1-Pt2)/Pt1) \times 100\%$, where $Pt1$ represents the average particle size of the first type of abrasive particle and $Pt2$ represents the average particle size of the second type of abrasive particle.

In a further embodiment, the second type of abrasive particle can include a first grade of abrasive particles and a second grade of abrasive particles, where different grades of abrasive particles can differ from each other based on average particle size. In some cases, the first grade of abrasive particles can have an average particle size of no greater than about 0.83 mm, no greater than about 0.76 mm, or no greater than about 0.71 mm. Additionally, the first grade of abrasive particles can have an average particle size of at least approximately 0.57 mm, at least approximately 0.61 mm, or at least approximately 0.68 mm. It will be appreciated that the average particle size of the first grade of abrasive particles can be within a range between any of the values noted above. In a particular illustrative embodiment, the average particle size of the first grade of abrasive particles can be within a range of about 0.68 mm to about 0.76 mm.

In particular embodiments, the second grade of abrasive particles can have an average particle size of no greater than about 1.15 mm, no greater than about 1.06 mm, or no greater than about 1 mm. In other embodiments, the second grade of abrasive particles can have an average particle size of at least approximately 0.88 mm, at least approximately 0.93 mm, or at least approximately 0.96 mm. It will be appreciated that the average particle size of the second grade of abrasive particles can be within a range between any of the values noted above. In a particular illustrative embodiment, the average particle size of the second grade of abrasive particles can be within a range of about 0.96 mm to about 1.06 mm.

In some instances, the average particle size of the first grade of abrasive particles is within about 30% of the average particle size of the second grade of abrasive particles, within about 40% of the average particle size of the second grade of abrasive particles, within about 50% of the average particle size of the second grade of abrasive particles, within about 60% of the average particle size of the second grade of abrasive particles, within about 70% of the average particle size of the second grade of abrasive particles, within about 80% of the average particle size of the second grade of abrasive particles, or within about 90% of the average particle size of the second grade of abrasive particles. The relationship between the average particle size of the first grade of abrasive particles of the second type of abrasive particle and the average particle size of the second grade of abrasive particles of the second type of abrasive particle can be calculated based on the equation $((Gt1-Gt2)/Gt1) \times 100\%$, where $Gt1$ represents the average particle size of the first grade of abrasive particles of the second type of abrasive particle and $Gt2$ represents the average particle size of the second grade of abrasive particles of the second type of abrasive particle.

In a particular embodiment, the second type of abrasive particles can include an oxide, such as alumina, zirconia, or a combination thereof. Some exemplary alumina materials can include brown fused alumina, white fused alumina, or a combination thereof. Notably, in one embodiment, the alumina composition of the second type of abrasive particle can be distinct from an alumina composition of the first type of abrasive particle.

In an illustrative embodiment, the abrasive particles of the mixture can consist essentially of black alumina and brown fused alumina. In one embodiment, the brown fused alumina can include $Al_2O_3$ within a range of about 92 wt % to about 98 wt %, $Fe_2O_3$ within a range of about 0.3 wt % to about 0.7 wt %, CaO within a range of about 0.3 wt % to about 0.8 wt %, $TiO_2$ within a range of about 1.1 wt % to about 3.2 wt %, $SiO_2$ within a range of about 0.3 wt % to about 1.7 wt %, MgO within a range of about 0.1 wt % to about 0.4 wt %, or any combination thereof.

In an embodiment, the mixture can include at least about 20 wt % bond material for a total weight of the mixture, at least about 27 wt % bond material for a total weight of the mixture, or at least about 32 wt % bond material for a total weight of the mixture. In other embodiments, the mixture can include no greater than about 43 wt % bond material for a total weight of the mixture, no greater than about 39 wt % bond material for a total weight of the mixture, or no greater than about 35 wt % bond material for a total weight of the mixture. It will be appreciated that the content of bond material can be within a range between any of the values noted above. In a particular illustrative embodiment, the mixture can include an amount of bond material within a range of about 27 wt % to about 35 wt % for a total weight of the mixture.

In certain situations, the bond material can include at least about 41 wt % of a resin bond material for a total weight of the bond material, at least about 46 wt % of a resin bond material for a total weight of the bond material, or at least about 52 wt % of a resin bond material for a total weight of the bond material. In other instances, the bond material can include no greater than about 67 wt % of a resin bond material for a total weight of the bond material, no greater than about 61 wt % of a resin bond material for a total weight of the bond material, or no greater than about 56 wt % of a resin bond material for a total weight of the bond material. It will be appreciated that the content of resin bond material can be within a range between any of the values noted above. In a particular illustrative embodiment, the content of a resin bond material can be within a range of about 46 wt % to about 56 wt % of a total weight of the bond material. In another particular illustrative embodiment, the resin bond material can include an epoxy resin, a polyester resin, a phenolic resin, a cyanate ester resin, a polyurethane resin, shellacs, or a combination thereof.

In another embodiment, the mixture can include at least about 6 wt % resin bond material for a total weight of the mixture, at least about 11 wt % resin bond material for a total weight of the mixture, or at least about 15 wt % resin bond material for a total weight of the mixture. Additionally, the mixture can include no greater than about 24 wt % resin bond material for a total weight of the mixture, no greater than about 19 wt % resin bond material for a total weight of the mixture, or no greater than about 17 wt % resin bond material for a total weight of the mixture. It will be appreciated that the content of the resin bond material can be within a range between any of the values noted above.

Furthermore, the resin bond material can be provided to the mixture as a liquid, a solid, or both. In an embodiment, the mixture can include a liquid phenolic resin, such as a resole resin, and a powdered phenolic resin, such as a novolac resin. In one illustrative embodiment, the powdered resin can include hexamine within a range of about 6 wt % to about 14 wt % for a total weight of the powdered resin. In certain embodiments, a ratio of powdered resin to liquid resin by weight can be at least about 1:1, at least about 1.5:1, at least about 2:1, or at least about 3:1. In other embodiments, a ratio of powder resin to liquid resin by weight can be no greater than about 6:1, no greater than about 5:1, or no greater than about 4:1.

The bond material can also include one of more filler materials. In certain aspects, the bond material can include at least about 39 wt % filler material for a total weight of the bond material, at least about 44 wt % filler material for a total weight of the bond material, or at least about 48 wt % filler material for a total weight of the bond material. In other aspects, the bond material can include no greater than about 60 wt % filler material for a total weight of the bond material, no greater than about 57 wt % filler material for a total weight of the bond material, or no greater than about 52 wt % filler material for a total weight of the bond material. It will be appreciated that the content of filler material can be within a range between any of the values noted above. In a particular illustrative embodiment, the content of filler material can be within a range of about 44 wt % filler material to about 52 wt % filler material for a total weight of the bond material.

In an additional embodiment, the mixture can include at least about 5 wt % filler material for a total weight of the mixture, at least about 9 wt % filler material for a total weight of the mixture, or at least about 14 wt % filler material for a total weight of the mixture. Additionally, the mixture can include no greater than about 23 wt % filler material for a total weight of the mixture, no greater than about 19 wt % filler material for a total weight of the mixture, or no greater than about 15 wt % filler material for a total weight of the mixture. It will be appreciated that the content of the filler material can be within a range between any of the values noted above.

The filler material can have a material selected from the group consisting of powders, granules, spheres, fibers, and a combination thereof. In one embodiment, the filler material can include a material selected from the group consisting of an inorganic material, an organic material, and a combination thereof. In a further embodiment, the filler material can include a material selected from the group consisting of sand, bubble alumina, bauxite, chromites, magnesite, dolomites, bubble mullite, borides, titanium dioxide, carbon products (e.g., carbon black, coke or graphite), wood flour, clay, talc, hexagonal boron nitride, molybdenum disulfide, feldspar, nepheline syenite, glass spheres, glass fibers, $CaF_2$, $KBF_4$, Cryolite ($Na_3AlF_6$), a potassium aluminum fluoride, such as potassium Cryolite ($K_3AlF_6$), pyrites, ZnS, copper sulfide, a material including $Fe_2S$, such as Pyrox, mineral oil, fluorides, carbonates, calcium carbonate, and a combination thereof.

In one embodiment, a total density of the bond material is at least about 1.54 $g/cm^3$, at least about 1.62 $g/cm^3$, at least about 1.70 $g/cm^3$, or at least about 1.82 $g/cm^3$. In another embodiment, a total density of the bond material is no greater than about 2.41 $g/cm^3$, no greater than about 2.26 $g/cm^3$, no greater than about 2.09 $g/cm^3$, or no greater than about 1.98 $g/cm^3$. It will be appreciated that the total density of the bond material can be within a range between any of the values noted above. In a particular illustrative embodiment, the total density of the bond material can be within a range of about 1.82 $g/cm^3$ to about 2.09 $g/cm^3$.

In some instances, the mixture can be combined in multiple steps. In one example, the abrasive particles are mixed with a liquid resin material to cause the liquid resin to coat the abrasive particles. A powdered phenolic resin and filler materials are separately blended in a mixer and the wetted abrasive particles are then added to and mixed with the blended powders to uniformly coat the wetted abrasive particles with the blended powders.

At 104, the method 100 includes placing the mixture into a mold. The mold can be made of stainless-steel, high carbon-steel, high chrome-steel, another suitable material, or a combination thereof. In some situations, one or more layers of the mixture can be placed into the mold, such as by linear or rotational spreading. In an illustrative embodiment, other components, such as one or more reinforcement layers, can be placed above, below, or both above and below, at least one of the layers of the mixture. In certain embodiments, a reinforcement layer can comprise a material selected from the group consisting of an organic material, an inorganic material, and a combination thereof. Additionally, the reinforcement layer can comprise a material selected from the group consisting of a fabric, a fiber, a film, a woven material, a non-woven material, a glass, a fiberglass, a ceramic, a polymer, a resin, a polymer, a fluorinated polymer, an epoxy resin, a polyester resin, a polyurethane, a polyester, a rubber, a polyimide, a polybenzimidazole, an aromatic polyamide, a modified phenolic resin, and a combination thereof.

At 106, the method 100 includes applying a pressing process to the mixture while in the mold. In situations when multiple abrasive layers are formed, each of the abrasive layers can be subjected to a respective pressing process. The pressing process can include a cold pressing process, a warm pressing process, or a hot pressing process. In an illustrative embodiment, a warm pressing process can be applied at a temperature within a range of about 35° C. to about 75° C.

At 108, the method 100 includes heating the mixture to produce a cutting wheel. In some embodiments, the heating of the mixture to produce the cutting wheel may be optional.

Figure 2:
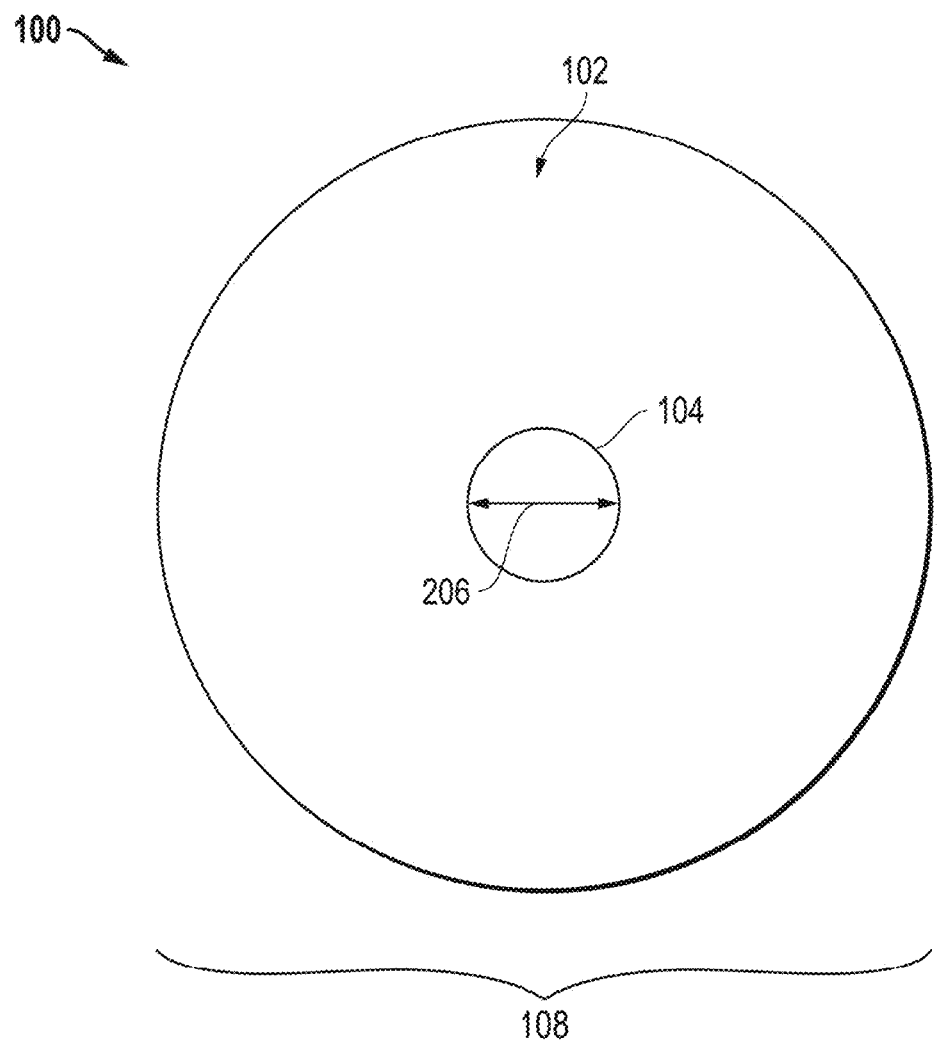
FIG. 2 includes a side view of a cutting wheel in accordance with an embodiment.

FIG. 2 includes a view of a cutting wheel 200 in accordance with an embodiment. The cutting wheel 200 includes a body 202 and a mounting hole 204 for mounting the cutting wheel 200 to a cutting tool. A diameter 206 of the mounting hole 204 can be an inner diameter of the body 202 and the body 202 can have an outer diameter 208. In an embodiment, the outer diameter 208 can be at least about 220 mm, at least about 270 mm, at least about 310 mm, or at least about 360 mm. In another embodiment, the outer diameter 208 can be no greater than about 535 mm, no greater than about 457 mm, no greater than about 415 mm, or no greater than about 355 mm. It will be appreciated that the outer diameter 208 of the body 202 can be within a range between any of the values noted above.

In certain aspects, the inner diameter 206 can be at least about 35 mm, at least about 46 mm, or at least about 54 mm. In other instances, the inner diameter 206 can be no greater than about 90 mm, no greater than about 77 mm, or no greater than about 62 mm. It will be appreciated that the inner diameter 206 of the body 202 can be within a range between any of the values noted above.

The body 202 can also have a thickness of at least about 0.7 mm, at least about 1.5 mm, or at least about 1.9 mm. In some cases, the body can have a thickness of no greater than about 6.5 mm, no greater than about 5.7 mm, no greater than about 4.8 mm, no greater than about 3.5 mm, or no greater than about 2.2 mm. It will be appreciated that the thickness of the body 202 can be within a range between any of the values noted above. Further more, the body 202 can have a ratio of outer diameter 208 to thickness within a range between about 125:1 to about 15:1.

The body 202 can include materials included in the mixture used to form the cutting wheel 200 as described previously with respect to FIG. 1. For example, the body 202 can include the abrasive particles provided in the mixture, the bond material provided in the mixture, and any other components provided in the mixture. Additionally, the body 202 can also include one or more abrasive layers including the abrasive particles contained within the bond material. In certain instances, one or more reinforcement layers can be positioned adjacent to the one or more abrasive layers. In certain constructions, one or more of the reinforcement layers can be overlying or underlying material for an abrasive layer. In at least one embodiment, a reinforcement layer can be in direct contact with an abrasive layer. In a particular embodiment, a reinforcement layer can be bonded directly to and at least partially impregnating portions of an abrasive layer. In other designs of embodiments herein, at least one abrasive layer (or a plurality of abrasive layers) can be disposed between a first reinforcement layer and a second reinforcement layer. According to one construction, a plurality of abrasive layers can be employed as discrete intervening layers separating at least first and second reinforcement layers. It will be appreciated that any combination of reinforcement layers and abrasive layers are contemplated herein.

In a particular embodiment, the body 202 can include a first type of abrasive particle. In an illustrative embodiment, the first type of abrasive particle can include black alumina. Further, the first type of abrasive particle can have an average particle size as described previously with respect to the average particle size of the first type of abrasive particle of the mixture used to form the cutting wheel 200.

The body 202 can also include a second type of abrasive particle, such as brown fused alumina. In an embodiment, the second type of abrasive particle can have an average particle size as described previously with respect to the average particle size of the second type of abrasive particle of the mixture. Furthermore, the second type of abrasive particle can have a first grade of abrasive particles with a specified average particle size and a second grade of abrasive particles with an average particle size that is different from the specified average particle size of the first grade of abrasive particles. The first grade of abrasive particles and the second grade of abrasive particles of the second type of abrasive particle can have respective average particle sizes as described previously with respect to the average particle size of the first grade of abrasive particles and the second grade of abrasive particles of the mixture used to form the cutting wheel 200.

In an embodiment, the body 202 can include at least about 34 vol % abrasive particles for a total volume of the body 202, at least about 42 vol % abrasive particles for a total volume of the body 202, or at least about 46 vol % abrasive particles for a total volume of the body 202. In another embodiment, the body can include no greater than about 65 vol % abrasive particles for a total volume of the body 202, no greater than about 57 vol % abrasive particles for a total volume of the body 202, or no greater than about 51 vol % abrasive particles for a total volume of the body 202. It will be appreciated that the content of abrasive particles of the body 202 can be within a range between any of the values noted above. In a particular illustrative embodiment, the body 202 can include abrasive particles within a range of about 42 vol % to about 51 vol % for a total volume of the body 202.

In a particular embodiment, the body 202 can include at least about 10 vol % of the first type of abrasive particle for a total volume of the abrasive particles. For example, the body 202 can include at least about 30 vol % of the first type of abrasive particle for a total volume of the abrasive particles, at least about 40 vol % of the first type of abrasive particle for a total volume of the abrasive particles, at least about 50 vol % of the first type of abrasive particle for a total volume of the abrasive particles, at least about 60 vol % of the first type of abrasive particle for a total volume of the abrasive particles, or at least about 65 vol % of the first type of abrasive particle for a total volume of the abrasive particles. Additionally, the body 202 can include no greater than about 99 vol % of the first type of abrasive particle for a total volume of the abrasive particles, no greater than about 92 vol % of the first type of abrasive particles for a total volume of the abrasive particles, no greater than about 85 vol % of the first type of abrasive particle for a total volume of the abrasive particles, no greater than about 77 vol % of the first type of abrasive particle for a total volume of the abrasive particles, no greater than about 73 vol % of the first type of abrasive particle for a total volume of the abrasive particles, or no greater than about 70 vol % of the first type of abrasive particles for a total volume of the abrasive particles. It will be appreciated that the content of the first type of abrasive particle can be within a range between any of the values noted above. In a particular illustrative embodiment, the body 202 can include the first type of abrasive particle within a range of about 77 vol % to about 65 vol % for a total volume of abrasive particles. In a non-limiting illustrative embodiment, essentially all of the abrasive particles can include the first type of abrasive particles.

In another embodiment, the body 202 can include at least about 18 vol % of the first type of abrasive particle for a total volume of the body 202, at least about 24 vol % of the first type of abrasive particle for a total volume of the body 202, or at least about 31 vol % of the first type of abrasive particle for a total volume of the body 202. Additionally, the body 202 can include no greater than about 46 vol % of the first type of abrasive particle for a total volume of the body 202, no greater than about 41 vol % of the first type of abrasive particle for a total volume of the body 202, or no greater than about 34 vol % of the first type of abrasive particle for a total volume of the body 202. It will be appreciated that the content of the first type of abrasive particle can be within a range between any of the values noted above. In a particular illustrative embodiment, the body 202 can include the first type of abrasive particle within a range of about 28 vol % to about 36 vol % for a total volume of the body 202.

In another embodiment, the body 202 can include at least about 3 vol % of the second type of abrasive particle for a total volume of the abrasive particles, at least about 9 vol % of the second type of abrasive particle for a total volume of the abrasive particles, at least about 16 vol % of the second type of abrasive particle for a total volume of the abrasive particles, or at least about 23 vol % of the second type of abrasive particle for a total volume of the abrasive particles. Additionally, the body 202 can include no greater than about 42 vol % of the second type of abrasive particle for a total volume of the abrasive particles, no greater than about 36 vol % of the first type of abrasive particle for a total volume of the abrasive particles, or no greater than about 30 vol % of the first type of abrasive particle for a total volume of the abrasive particles. It will be appreciated that the content of the second type of abrasive particle can be within a range between any of the values noted above. In a particular illustrative embodiment, the body 202 can include the second type of abrasive particle within a range of about 23 vol % to about 36 vol % for a total volume of abrasive particles.

In another embodiment, the body 202 can include at least about 6 vol % of the second type of abrasive particle for a total volume of the body 202, at least about 11 vol % of the second type of abrasive particle for a total volume of the body 202, or at least about 14 vol % of the second type of abrasive particle for a total volume of the body 202. Additionally, the body 202 can include no greater than about 26 vol % of the second type of abrasive particle for a total volume of the body 202, no greater than about 21 vol % of the second type of abrasive particle for a total volume of the body 202, or no greater than about 17 vol % of the second type of abrasive particle for a total volume of the body 202. It will be appreciated that the content of the second type of abrasive particle can be within a range between any of the values noted above. In a particular illustrative embodiment, the body 202 can include the second type of abrasive particle within a range of about 11 vol % to about 16 vol % for a total volume of the body 202.

In other embodiments, the body 202 can include at least about 31 vol % bond material for a total volume of the body 202, at least about 32 vol % bond material for a total volume of the body 202, at least about 34 vol % bond material for a total volume of the body 202, at least about 36 vol % bond material for a total volume of the body 202, at least about 38 vol % bond material for a total volume of the body 202, or at least about 40 vol % bond material for a total volume of the body 202. Additionally, the body can include no greater than about 51 vol % bond material for a total volume of the body 202, no greater than about 47 vol % bond material for a total volume of the body 202, or no greater than about 44 vol % bond material for a total volume of the body 202. It will be appreciated that the content of the bond material of the body 202 can be within a range between any of the values noted above. In a particular illustrative embodiment, the content of the bond material of the body 202 can be within a range of about 36 vol % to about 44 vol % for a total volume of the body 202.

In some situations, the body 202 can include at least about 55 vol % of a resin bond material for a total volume of the bond material, at least about 63 vol % of a resin bond material for a total volume of the bond material, at least about 71 vol % of a resin bond material for a total volume of the bond material, or at least about 76 vol % of the bond material for a total volume of the bond material. In other aspects, the body 202 can include no greater than about 92 vol % of a resin bond material for a total volume of the bond material, no greater than about 84 vol % of a resin bond material for a total volume of the bond material, or no greater than about 80 vol % of a resin bond material for a total volume of the bond material. It will be appreciated that the content of the resin bond material of the body 202 can be within a range between any of the values noted above. In a particular illustrative embodiment, the content of the resin bond material of the body 202 can be within a range of about 76 vol % to about 84 vol % for a total volume of the bond material.

In another embodiment, the body 202 can include at least about 22 vol % of the resin bond material for a total volume of the body 202, at least about 29 vol % of the resin bond material for a total volume of the body 202, or at least about 34 vol % of the resin bond material for a total volume of the body 202. Additionally, the body 202 can include no greater than about 47 vol % of the resin bond material for a total volume of the body 202, no greater than about 42 vol % of the resin bond material for a total volume of the body 202, or no greater than about 37 vol % of the resin bond material for a total volume of the body 202. It will be appreciated that the content of the resin bond material can be within a range between any of the values noted above. In a particular illustrative embodiment, the body 202 can include the resin bond material within a range of about 28 vol % to about 37 vol % for a total volume of the body 202.

In an embodiment, the body 202 can include at least about 4 vol % filler material for a total volume of the bond material, at least about 11 vol % filler material for a total volume of the bond material, or at least about 16 vol % filler material for a total volume of the bond material. Further, the body 202 can include no greater than about 30 vol % filler material for a total volume of the bond material, no greater than about 25 vol % filler material for a total volume of the bond material, or no greater than about 20 vol % filler material for a total volume of the bond material. It will be appreciated that the content of the filler material of the body 202 can be within a range between any of the values noted above. In a particular illustrative embodiment, the content of the filler material of the body 202 can be within a range of about 16 vol % to about 25 vol % for a total volume of the bond material.

In another embodiment, the body 202 can include at least about 2 vol % of the filler material for a total volume of the body 202, at least about 5 vol % of the filler material for a total volume of the body 202, or at least about 7 vol % of the filler material for a total volume of the body 202. Additionally, the body 202 can include no greater than about 16 vol % of the filler material for a total volume of the body 202, no greater than about 12 vol % of the filler material for a total volume of the body 202, or no greater than about 9 vol % of the filler material for a total volume of the body 202. It will be appreciated that the content of the filler material can be within a range between any of the values noted above. In a particular illustrative embodiment, the body 202 can include the filler material within a range of about 6 vol % to about 10 vol % for a total volume of the body 202.

In one aspect, the filler material can consist essentially of pyrite material. In other embodiments, the filler material can include at least about 45 vol % pyrite material for a total volume of filler material, at least about 53 vol % pyrite material for a total volume of filler material, or at least about 60 vol % pyrite material for a total volume of filler material. In additional embodiments, the filler material can include no greater than about 95 vol % pyrite material for a total volume of filler material, no greater than about 83 vol % pyrite material for a total volume of filler material, or no greater than about 69 vol % pyrite material for a total volume of filler material. It will be appreciated that the content of the pyrite material can be within a range between any of the values noted above. In a particular illustrative embodiment, the content of the pyrite material can be within a range of about 69 vol % to about 52 vol % for a total volume of the filler material.

In certain instances, the filler material can include at least about 5 vol % cryolite material for a total volume of filler material, at least about 12 vol % cryolite material for a total volume of filler material, or at least about 16 vol % cryolite material for a total volume of filler material. Also, the filler material can include no greater than about 33 vol % cryolite material for a total volume of filler material, no greater than about 25 vol % cryolite material for a total volume of filler material, or no greater than about 20 vol % cryolite material for a total volume of filler material. It will be appreciated that the content of the cryolite material can be within a range between any of the values noted above. In a particular illustrative embodiment, the content of the cryolite material can be within a range of about 16 vol % to about 25 vol % for a total volume of the filler material.

In other embodiments, the filler material can include at least about 2 vol % potassium aluminum fluoride material for a total volume of filler material, at least about 7 vol % potassium aluminum fluoride material for a total volume of filler material, at least about 14 vol % potassium aluminum fluoride material for a total volume of filler material, or at least about 20 vol % potassium aluminum fluoride material for a total volume of filler material. In additional embodiments, the filler material can include no greater than about 34 vol % potassium aluminum fluoride material for a total volume of filler material, no greater than about 29 vol % potassium aluminum fluoride material for a total volume of filler material, or no greater than about 24 vol % potassium aluminum fluoride material for a total volume of filler material. It will be appreciated that the content of the potassium aluminum fluoride material can be within a range between any of the values noted above. In a particular illustrative embodiment, the content of the potassium aluminum fluoride material can be within a range of about 14 vol % to about 24 vol % for a total volume of the filler material.

In particular embodiments, the body 202 can include an amount of porosity, such as at least about 6 vol % porosity for a total volume of the body 202, at least about 11 vol % porosity for a total volume of the body 202, or at least about 14 vol % porosity for a total volume of the body 202. In additional cases, the body 202 can include no greater than about 31 vol % porosity for a total volume of the body 202, no greater than about 25 vol % porosity for a total volume of the body 202, or no greater than about 20 vol % porosity for a total volume of the body 202. It will be appreciated that the porosity of the body 202 can be within a range between any of the values noted above. In a particular illustrative embodiment, the porosity of the body 202 can be within a range of about 14 vol % to about 25 vol % for a total volume of the body 202.

Figure 3:
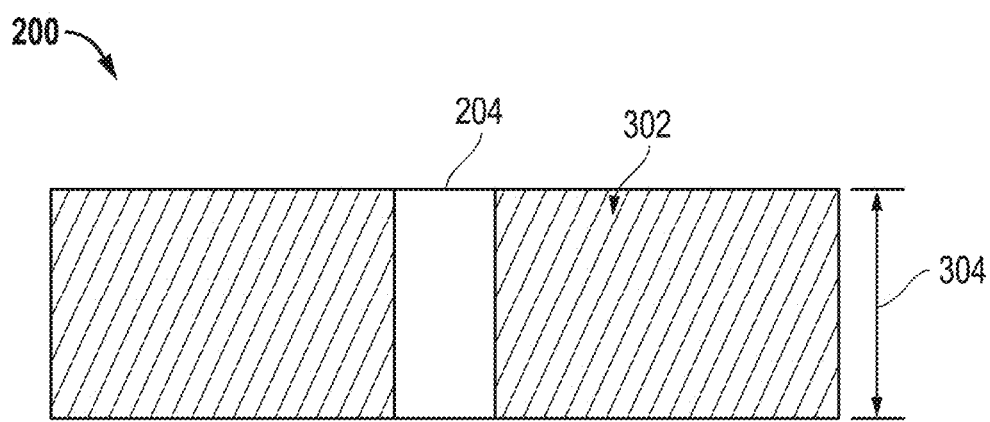
FIG. 3 includes cross-sectional view of the cutting wheel of FIG. 2 according to an embodiment.

FIG. 3 includes cross-sectional view of the cutting wheel 200 of FIG. 2 according to an embodiment. In the illustrative embodiment of FIG. 3, the cutting wheel has a mounting hole 204 and an abrasive layer 302. The abrasive layer 302 can include abrasive particles contained within a bond material. The abrasive layer 302 can also have a thickness 304.

Figure 4:
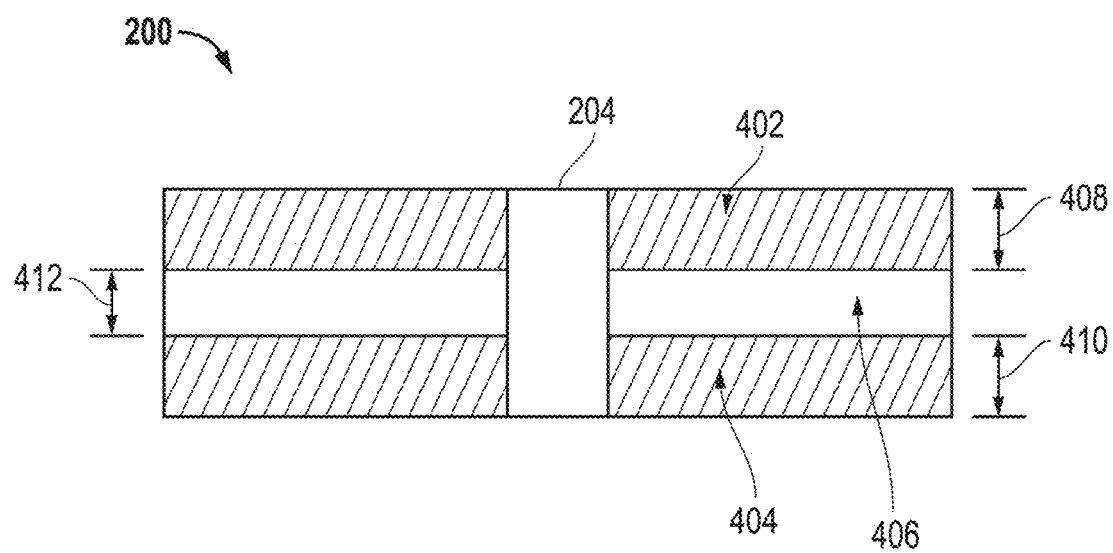
FIG. 4 includes a cross-sectional view of the cutting wheel of FIG. 2 in accordance with another embodiment.

FIG. 4 includes a cross-sectional view of the cutting wheel 200 of FIG. 2 in accordance with another embodiment. In the illustrative embodiment of FIG. 4, the cutting wheel has a mounting hole 204, a first abrasive layer 402 and a second abrasive layer 404. The cutting wheel 200 can also include a reinforcement layer 406. The first abrasive layer 402 and the second abrasive layer 404 can include abrasive particles contained within a bond material. In some cases, the content of abrasive particles and the content of bond material of the first abrasive layer 402 and the second abrasive layer 404 can be substantially the same, while in other situations, the content of the abrasive particles and the content of the bond material of the first abrasive layer 40 and the second abrasive layer 404 can be different.

The first abrasive layer 402 can have a thickness 408 and the second abrasive layer 404 can have a thickness 410. In addition, the reinforcement layer 406 can have a thickness 412. In some scenarios, the thickness 408 can be substantially the same as the thickness 410, while in other embodiments, the thickness 408 can be different from the thickness 410. Furthermore, the thickness 412 can be substantially the same or different with respect to the thickness 408, the thickness 410, or both.

Figure 5:
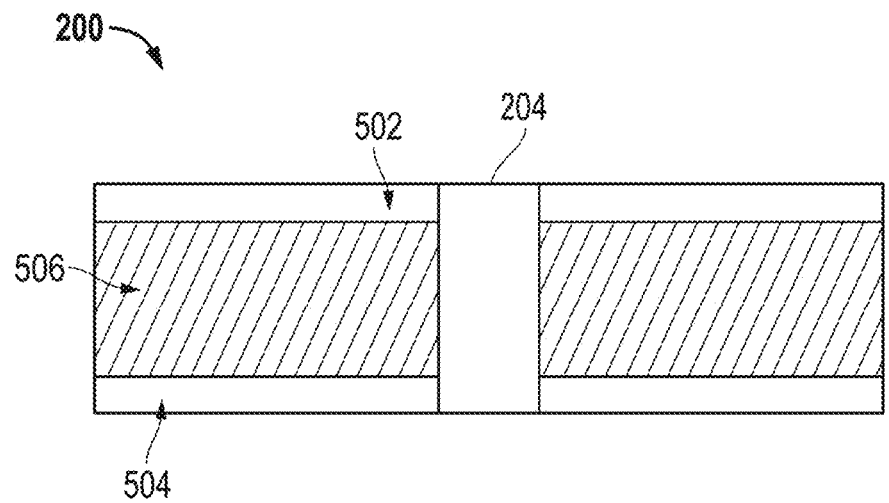
FIG. 5 includes a cross-sectional view of the cutting wheel of FIG. 2 in accordance with an additional embodiment.

FIG. 5 includes a cross-sectional view of the cutting wheel 200 of FIG. 2 in accordance with an additional embodiment. In the illustrative embodiment of FIG. 2, the cutting wheel 200 includes a mounting hole 204, a first reinforcement layer 502 and a second reinforcement layer 504. The cutting wheel 200 also includes an abrasive layer 506.

Figure 6:
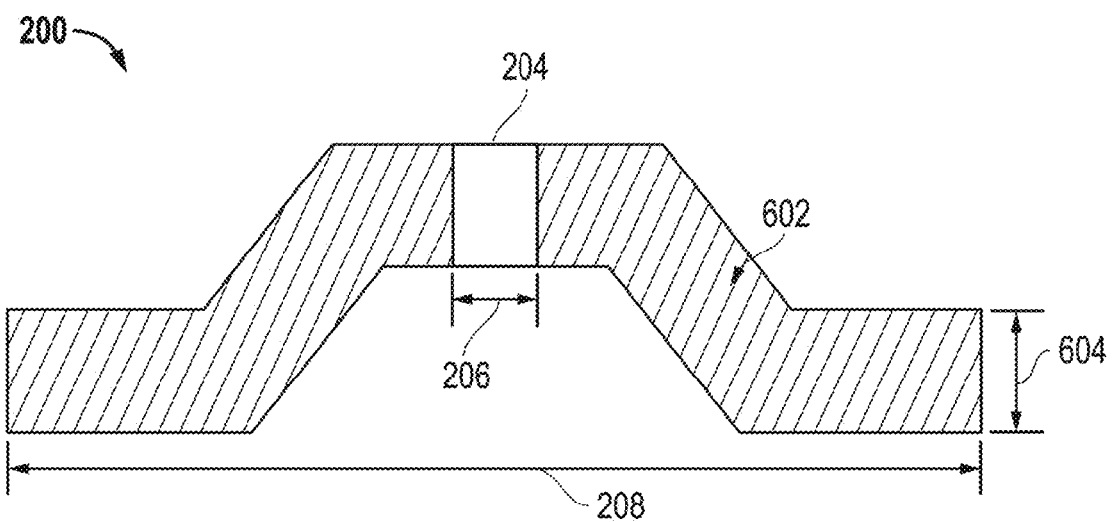
FIG. 6 includes a cross-sectional view of the cutting wheel of FIG. 2 having a depressed center configuration in accordance with an embodiment.

FIG. 6 includes a cross-sectional view of the cutting wheel 200 of FIG. 2 having a depressed center configuration in accordance with an embodiment. In the illustrative embodiment of FIG. 6, the cutting wheel 200 includes a mounting hole 204 having a diameter 206 and an abrasive layer 602 having a thickness 604. The cutting wheel 200 also includes an outer diameter 208.

Figure 7:
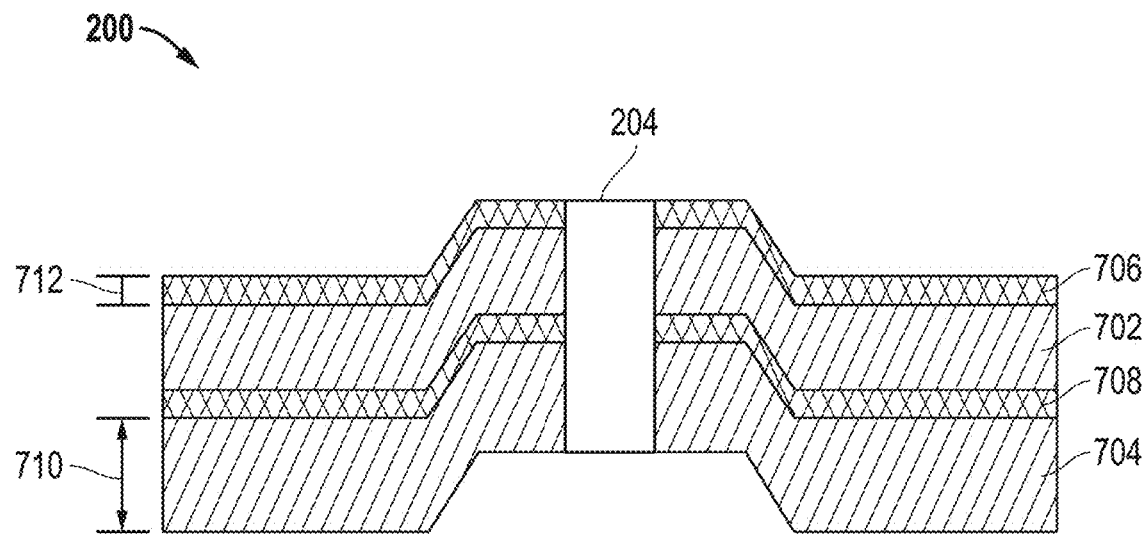
FIG. 7 includes a cross-sectional view of the cutting wheel of FIG. 2 having a depressed center configuration in accordance with another embodiment.

FIG. 7 includes a cross-sectional view of the cutting wheel 200 of FIG. 2 having a depressed center configuration in accordance with another embodiment. In the illustrative embodiment of FIG. 7, the cutting wheel 200 includes a mounting hole 204. The cutting wheel 200 also includes a first abrasive layer 702 and a second abrasive layer 704. Additionally, the cutting wheel 200 includes a first reinforcement layer 706 and a second reinforcement layer 708. Further, the first abrasive layer 702 and the second abrasive layer 704 can each have a respective thickness, such as thickness 710. The first reinforcement layer 706 and the second reinforcement layer 708 can each have a respective thickness, such as thickness 712.

Figure 8:
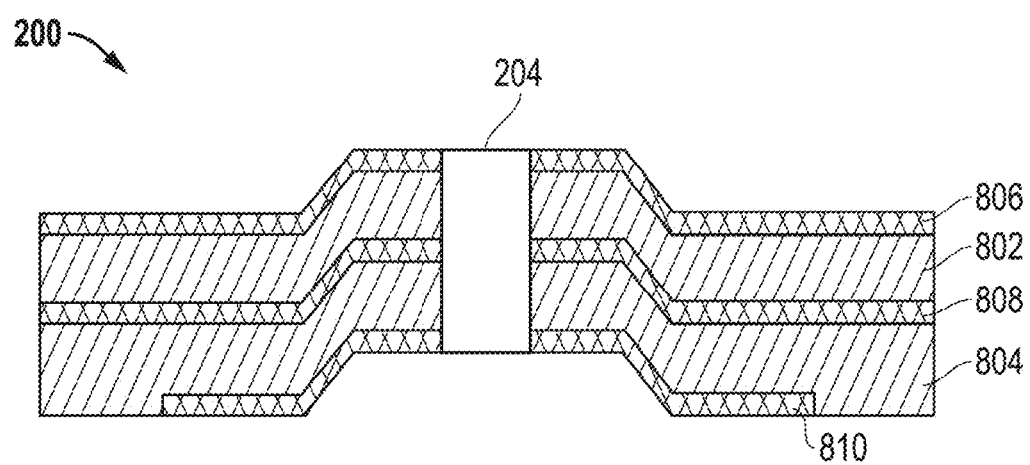
FIG. 8 includes a cross-sectional view of the cutting wheel of FIG. 2 having a depressed center configuration in accordance with an additional embodiment.

FIG. 8 includes a cross-sectional view of the cutting wheel 200 of FIG. 2 having a depressed center configuration in accordance with an additional embodiment. In the illustrative embodiment of FIG. 8, the cutting wheel 200 includes a mounting hole 204, a first abrasive layer 802, and a second abrasive layer 804. The cutting wheel 200 also includes a first reinforcement layer 806, a second reinforcement layer 808, and a third reinforcement layer 810. In some cases, as in the illustrative embodiment of FIG. 8, a portion of the second abrasive layer 804 can be in contact with the third reinforcement layer 810.

Figure 9:
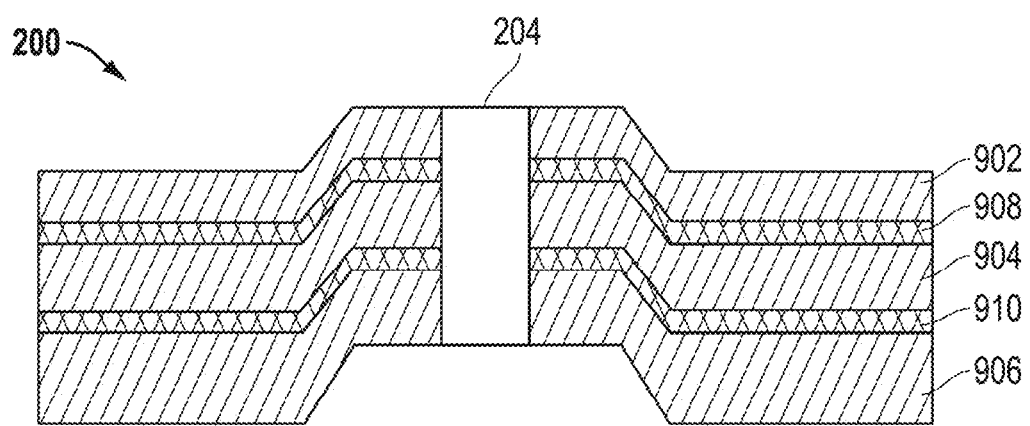
FIG. 9 includes a cross-sectional view of the cutting wheel of FIG. 2 having a depressed center configuration in accordance with a further embodiment.

FIG. 9 includes a cross-sectional view of the cutting wheel 200 of FIG. 2 having a depressed center configuration in accordance with a further embodiment. In the illustrative embodiment of FIG. 9, the cutting wheel 200 includes a mounting hole 204, a first abrasive layer 902, a second abrasive layer 904, and a third abrasive layer 906. The cutting wheel 200 also includes a first reinforcement layer 908 and a second reinforcement layer 910.

EXAMPLES

Sample cutting wheels are formed according to embodiments described herein. For example, sample 1 includes abrasive particles that consist essentially of brown fused alumina and includes bond material including a suitable bond composition having about 77 vol % to about 82 vol % phenolic resin bond material and about 18 vol % to about 23 vol % pyrite material for a total volume of bond material. In particular, sample 1 includes about 24 vol % to about 28 vol % phenolic resin and about 5 vol % to about 7 vol % pyrite material for a total volume of sample 1. In another example, sample 2 has abrasive particles that include brown fused alumina within a range of about 68 vol % to about 72 vol % and black alumina within a range of about 28 vol % to about 32 vol % for a total volume of abrasive particles. In a further example, sample 3 has abrasive particles that include black alumina within a range of about 48 vol % to about 52 vol % and brown fused alumina within a range of about 48 vol % to about 52 vol % for a total volume of abrasive particles. In an additional example, sample 4 has abrasive particles that include black alumina within a range of about 68 vol % to about 72 vol % and brown fused alumina within a range of about 28 vol % to about 32 vol % for a total volume of abrasive particles. Samples 2-4 have substantially the same bond composition as the bond composition of Sample 1.

Figure 10:
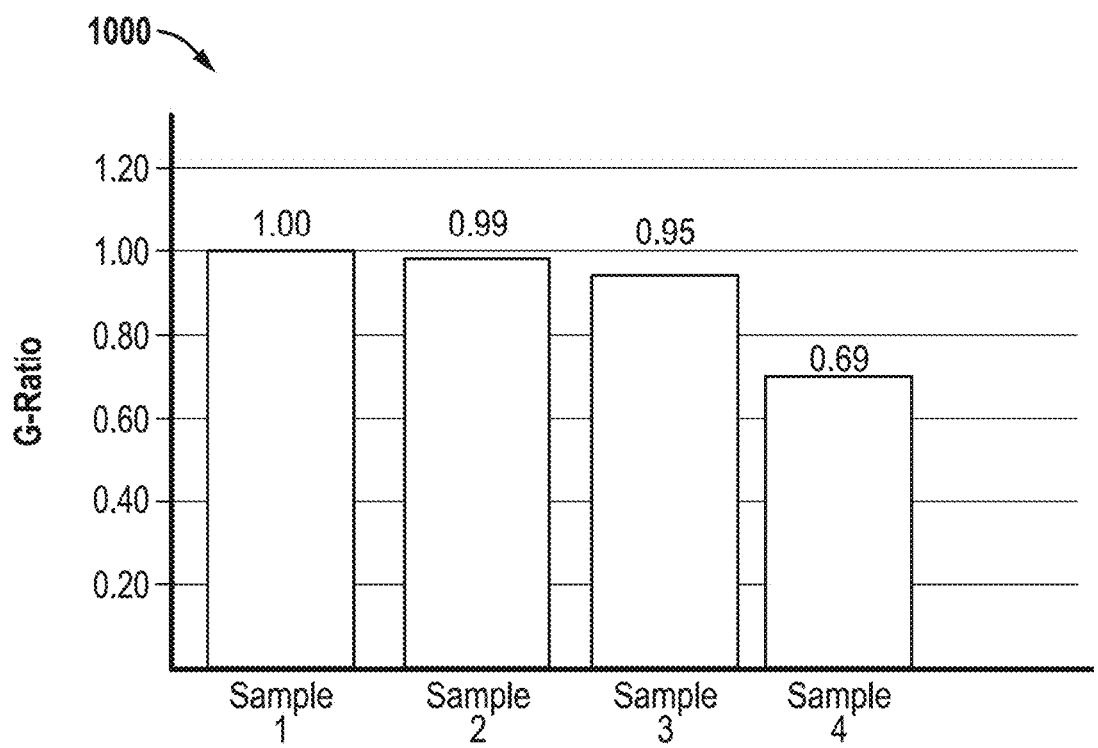
FIG. 10 includes a chart indicating a G-ratio for cutting wheels having different amounts of black alumina abrasive particles.
Figure 11:
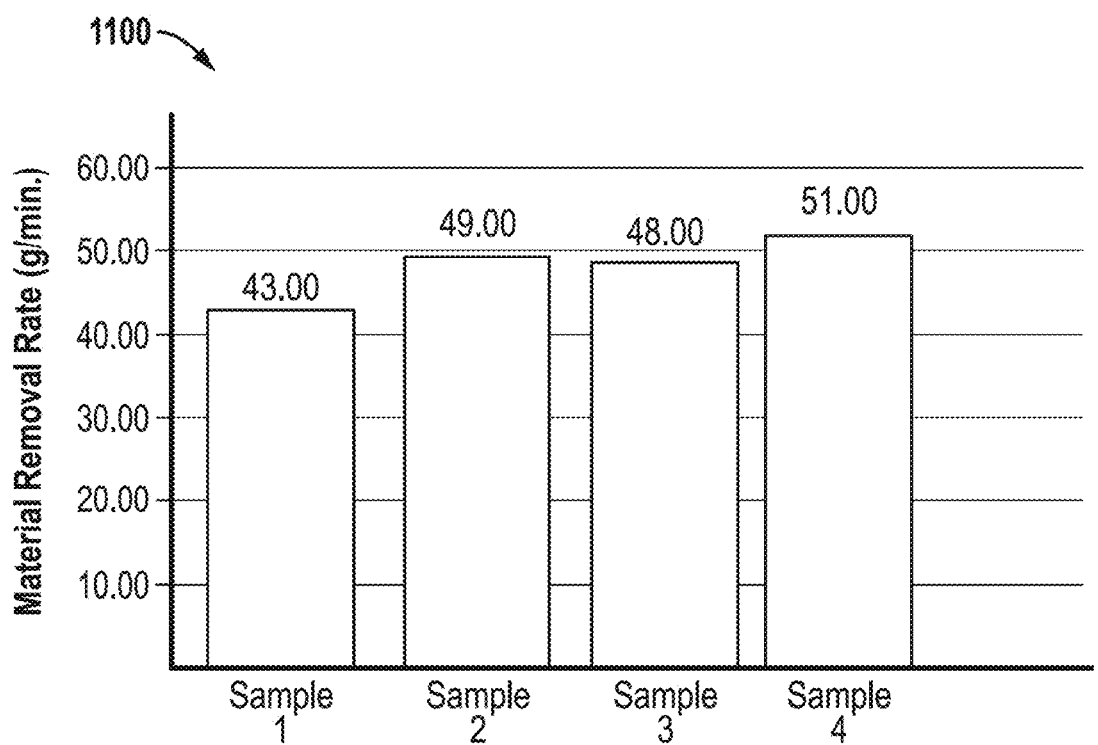
FIG. 11 includes a chart indicating material removal rate for cutting wheels having different amounts of black alumina abrasive particles.

Samples 1-4 are used to cut a 40 mm carbon steel workpiece with a 3 KW, 380 volt SQ-40-1 cutting tool from Laizhou Tongda Machinery Co., Ltd. The cutting tool is operated at a speed of about 2800 rotations per minute to about 2900 rotations per minute with a working current of about 6 amps. Twenty cuts are made to the workpiece. FIG. 10 includes a chart 1000 indicating a G-ratio for cutting wheels having different amounts of black alumina abrasive particles. G-ratio as used herein indicates an amount of material removed from the workpiece relative to an amount of material removed from the cutting wheel. FIG. 11 includes a chart 1100 indicating material removal rate for cutting wheels having different amounts of black alumina abrasive particles.

Figure 12:
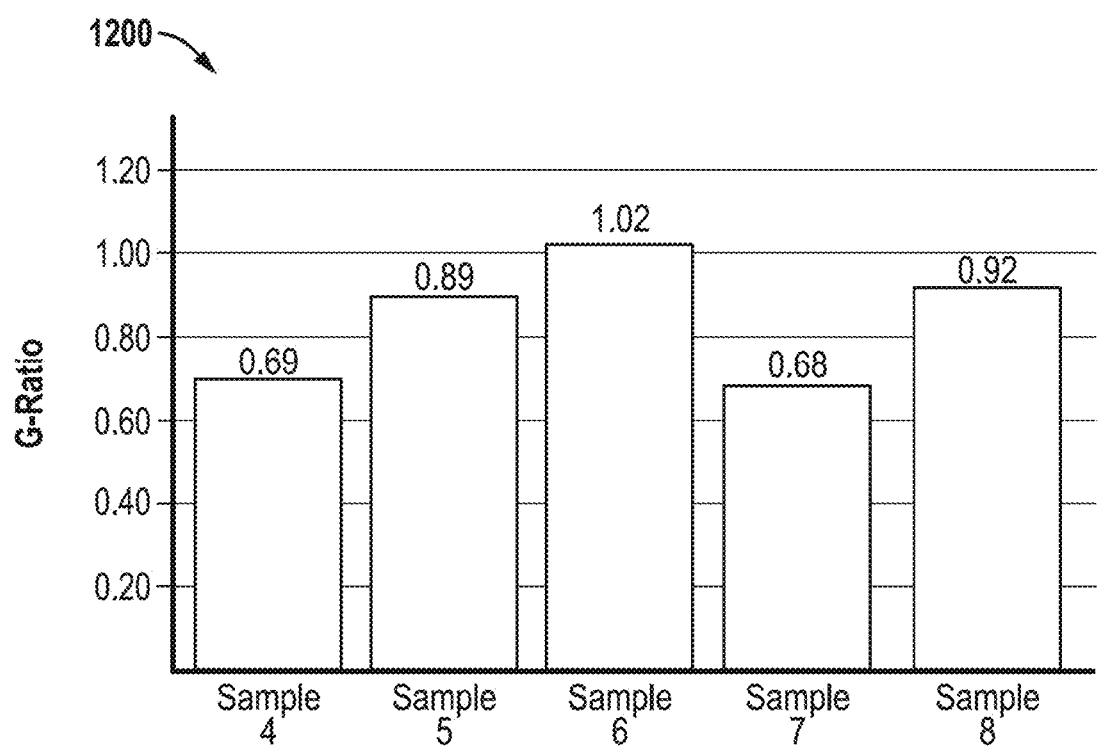
FIG. 12 includes a chart indicating a G-ratio for cutting wheels with different bond materials in accordance with embodiments herein.
Figure 13:
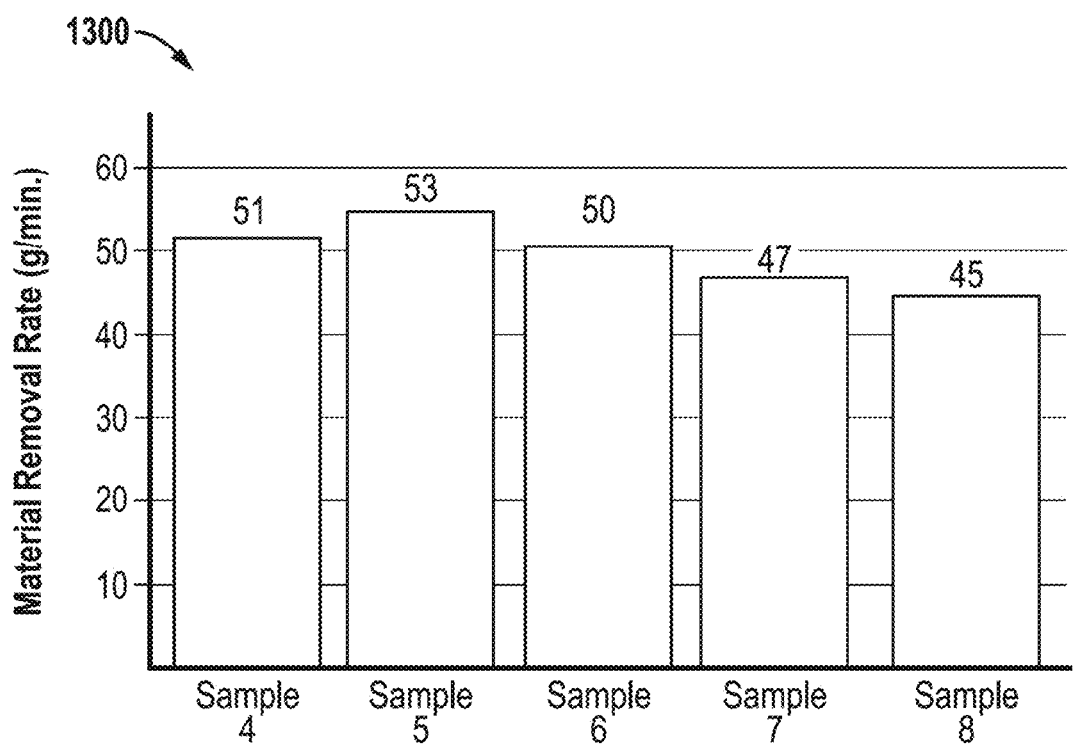
FIG. 13 includes a chart indicating material removal rate for cutting wheels with different bond materials in accordance with embodiments herein.

In addition, a number of cutting wheels, Samples 5-8, are made according to embodiments herein with various bond compositions. Further, Samples 5-8 have abrasive particles that include black alumina within a range of about 68 vol % to about 72 vol % and brown fused alumina within a range of about 28 vol % to about 32 vol %. Sample 5 is a cutting wheel having a bond composition of about 27 vol % to about 30 vol % phenolic resin and about 6 vol % to about 8 vol % pyrite material for a total volume of sample 5. Sample 6 is a cutting wheel having a bond composition of about 30 vol % to about 33 vol % phenolic resin and about 7 vol % to about 8.2 vol % pyrite material for a total volume of sample 6. Sample 7 is a cutting wheel having a bond composition of about 33 vol % to about 36 vol % phenolic resin and about 8.3 vol % to about 9 vol % pyrite material for a total volume of sample 7. Sample 8 is a cutting wheel having a bond composition of about 36 vol % to about 38 vol % phenolic resin and about 9 vol % to about 10 vol % pyrite material for a total volume of sample 8. Samples 5-8 are used to cut a 40 mm carbon steel workpiece with the cutting tool and under the conditions described previously with respect to Samples 1-4. FIG. 12 includes a chart 1200 indicating a G-ratio for cutting wheels with different bond materials in accordance with embodiments herein. FIG. 13 includes a chart 1300 indicating material removal rate for cutting wheels with different bond materials in accordance with embodiments herein.

The foregoing embodiments are directed to abrasive products, and particularly bonded abrasive cutting wheels, which represent a departure from the state-of-the-art. The cutting wheels of the embodiments herein utilize a combination of features that facilitate improved performance over conventional cutting wheels. As described in the present application, the cutting wheels of the embodiments herein utilize a particular amount and type of abrasive particles, particular amount and type of bond material, and have a particular amount of porosity. For example, since the abrasive products described herein are directed to high force per grit cutting operations, the bond composition is a harder bond composition than the bond materials used for low force per grit operations. In addition, to the discovery that such products could be formed effectively, despite being outside of the known realm of conventional abrasive products in terms of their grade and structure, it was also discovered that such products demonstrated improved cutting performance. In fact, quite unexpectedly, as indicated in FIG. 11, the cutting wheels of the embodiments herein having increasing amounts of black alumina, such as Sample 4, demonstrated higher material removal rates than wheels having a greater content of brown fused alumina, such as Samples 1, 2, and 3. In particular, the material removal rate of Sample 4 increased by about 5% to about 15% relative to the material removal rate of Samples 1-3. The increased cutting performance of the cutting wheels including greater amounts of black alumina is unexpected because the hardness of black alumina is less than that of brown fused alumina. In addition, the increased cutting performance of Sample 4 is unexpected relative to the cutting performance of Samples 1-3 because black alumina has a decreased content of aluminum oxide with respect to the aluminum oxide content of brown fused alumina. In addition, the increase in cutting performance with respect to Samples 3 and 4 is also unexpected based on the lighter weight of Samples 3 and 4 due to the decreased density of the black alumina abrasive particles. Without being tied to a particular theory, the increased material removal rate for the samples including higher amounts of black alumina may be due to the multiple phases described previously with respect to black alumina, which provide better friability during the cutting process. Furthermore, as indicated in FIG. 12 and FIG. 13, the use of certain bond material compositions provides an improved G-ratio comparable to that of cutting wheels including greater content of brown fused alumina, while still maintaining a material removal rate greater than that of the cutting wheels including greater content of brown fused alumina. For example, Sample 6 has a G-ratio comparable to that of the cutting wheels that have a greater content of brown fused alumina (samples 1-3), while providing improved cutting performance similar to that of Sample 4. Furthermore, Sample 6 has an improvement in the G-ratio of nearly 50% relative to the G-ratio of Sample 4. Thus, due to the decreased cost of black alumina and the decreased processing required to form black alumina, cutting wheels can be produced according to embodiments described herein, that are less expensive to produce and lighter weight than conventional cutting wheels including greater amounts of brown fused alumina, while maintaining the cutting performance and wheel life of conventional cutting wheels formed with greater amounts of brown fused alumina.

In other embodiments, an additional heat treatment process of black alumina was included. Versions of the black alumina heat treatment process included grain heat treatment at a temperature in a range of about 800° C. to about 1300° C. The heating rate was 5° C./min, and the holding time at the maximum temperature was 10 minutes. Finally, the samples were furnace cooled to room temperature. In other examples, heat treating the black alumina of the first type of abrasive particle prior to providing the abrasive mixture, can include heating the black alumina of the first type of abrasive particle. The black alumina may be heat treated to a temperature of at least about 800° C., such as at least about 900° C., or even at least about 1000° C. In other versions, the temperature can be not greater than about 1100° C., such as not greater than about 1000° C., even or not greater than about 900° C. In addition, the temperature can be in a range between any of these minimum and maximum values.

Figure 14:
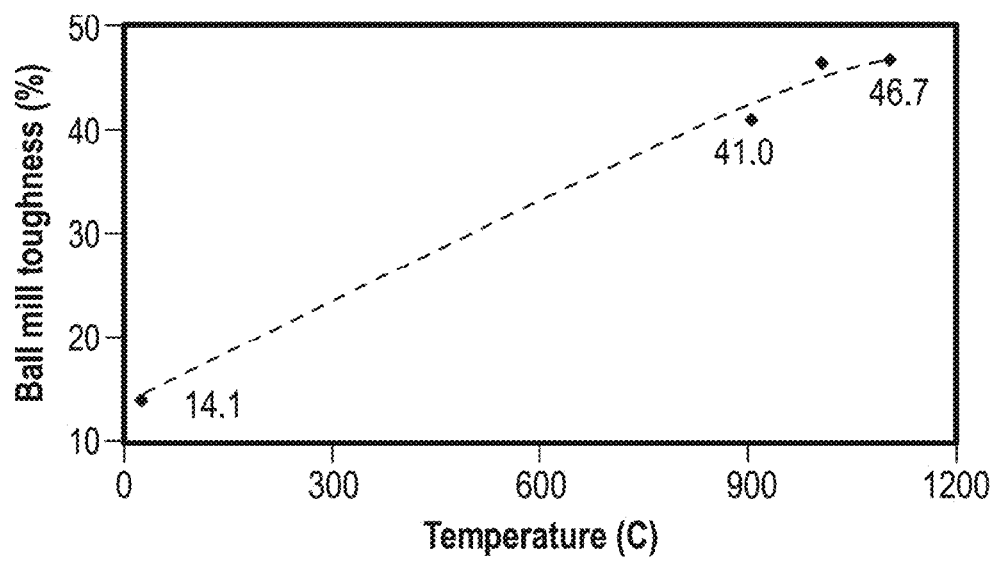
FIG. 14 includes a chart indicating ball mill toughness of black alumina over a range of heat treatment temperatures.

After the heat treatment, there is a significant increase in ball mill toughness of the black alumina grains, as depicted in FIG. 14. The ball mill toughness of the black alumina grains were tested pursuant to ANSI B74.8-1987 (R2001). The increase in ball mill toughness could be attributed to changes in the grain in three aspects: change of grain shape (e.g., more circular grain, higher toughness), change of microstructure (e.g., healing of cracks, etc.), and phase change. For example, the black alumina of the first type of abrasive particle can have a ball mill toughness of at least about 38%, such as at least about 39%, at least about 40%, at least about 42%, at least about 43%, at least about 44%, or even at least about 45%. In other versions, the ball mill toughness can be no greater than about 50%, such as no greater than about 49%, no greater than about 48%, or even no greater than about 47%. In addition, the ball mill toughness can be in a range between any of these minimum and maximum values.

Figure 15:
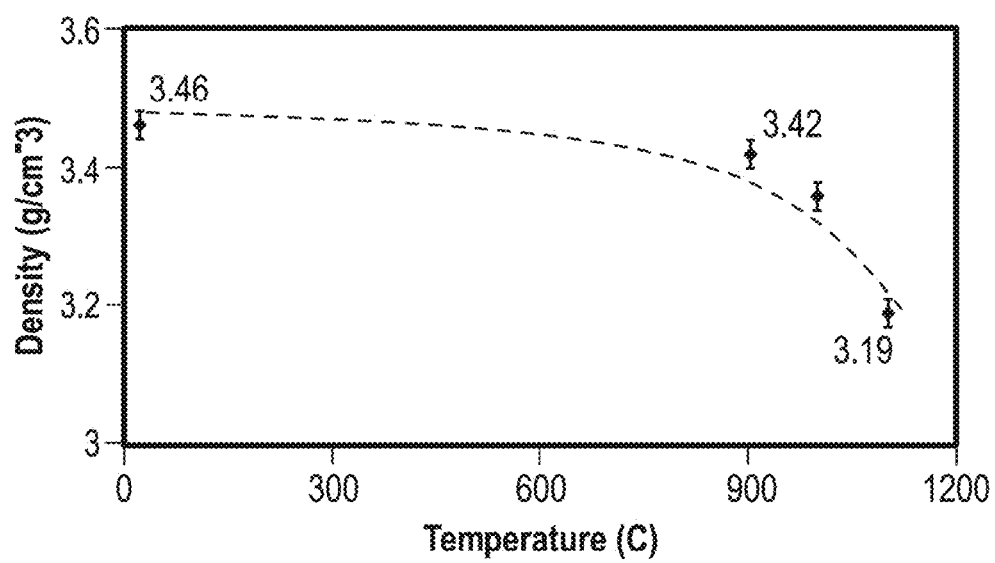
FIG. 15 includes a chart indicating density of black alumina over a range of heat treatment temperatures.

As shown in FIG. 15, the density of the black alumina also decreases with elevated heat treatment. For example, the density can be no greater than about 3.9 g/cm$^3$, such as no greater than about 3.8 g/cm$^3$, no greater than about 3.7 g/cm$^3$, no greater than about 3.6 g/cm$^3$, no greater than about 3.5 g/cm$^3$, no greater than about 3.4 g/cm$^3$, no greater than about 3.3 g/cm$^3$, or even no greater than about 3.2 g/cm$^3$. Alternatively, the density can be at least about 3.0 g/cm$^3$, such as at least about 3.1 g/cm$^3$, at least about 3.2 g/cm$^3$, at least about 3.3 g/cm$^3$, or even at least about 3.4 g/cm$^3$. The density also may be in a range between any of these minimum and maximum values.

Figure 16:
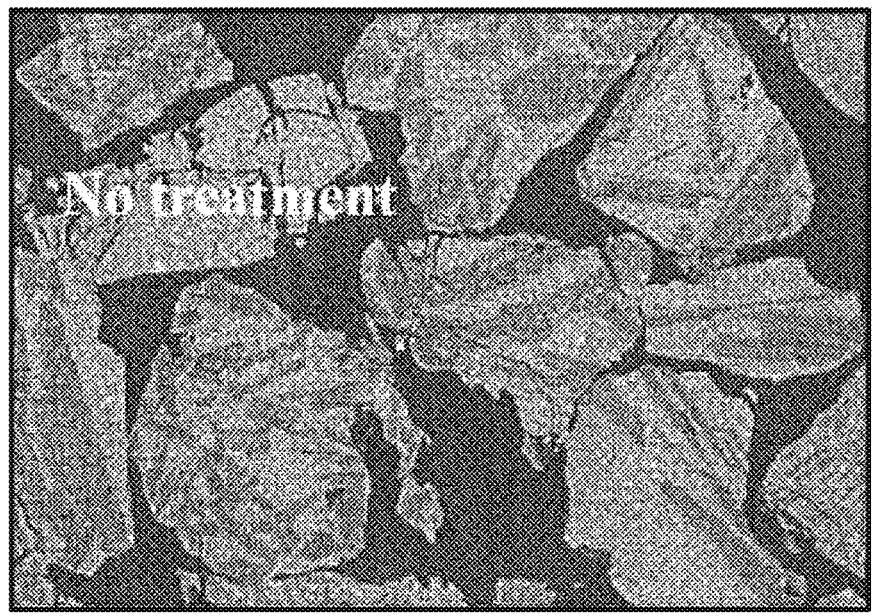
FIGS. 16 and 17 include photographs of black alumina without heat treatment and with heat treatment, respectively.
Figure 17:
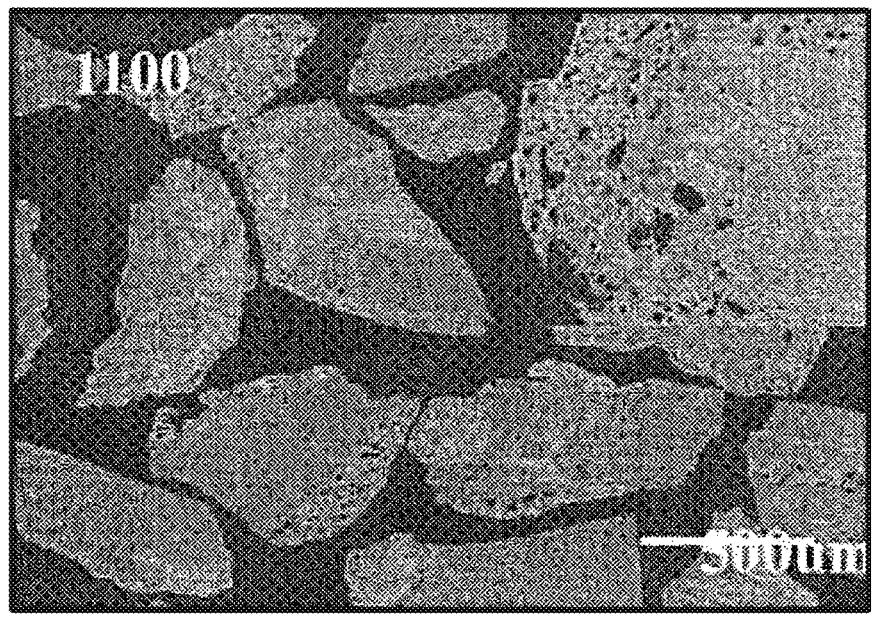

The change in density could be attributed to the change in porosity, as depicted in FIGS. 16 and 17. FIGS. 16 and 17 include scanning electron microscope (SEM) photographs of black alumina without heat treatment and with heat treatment, respectively. After heat treatment, the microstructure of black alumina improved in terms of micro-crack reduction, especially for those micro-cracks inside the secondary phases. As shown in the SEM photographs, most of the micro-cracks were healed. This appears to be a contribution to the increase of the toughness after heat treatment.

Figure 18:
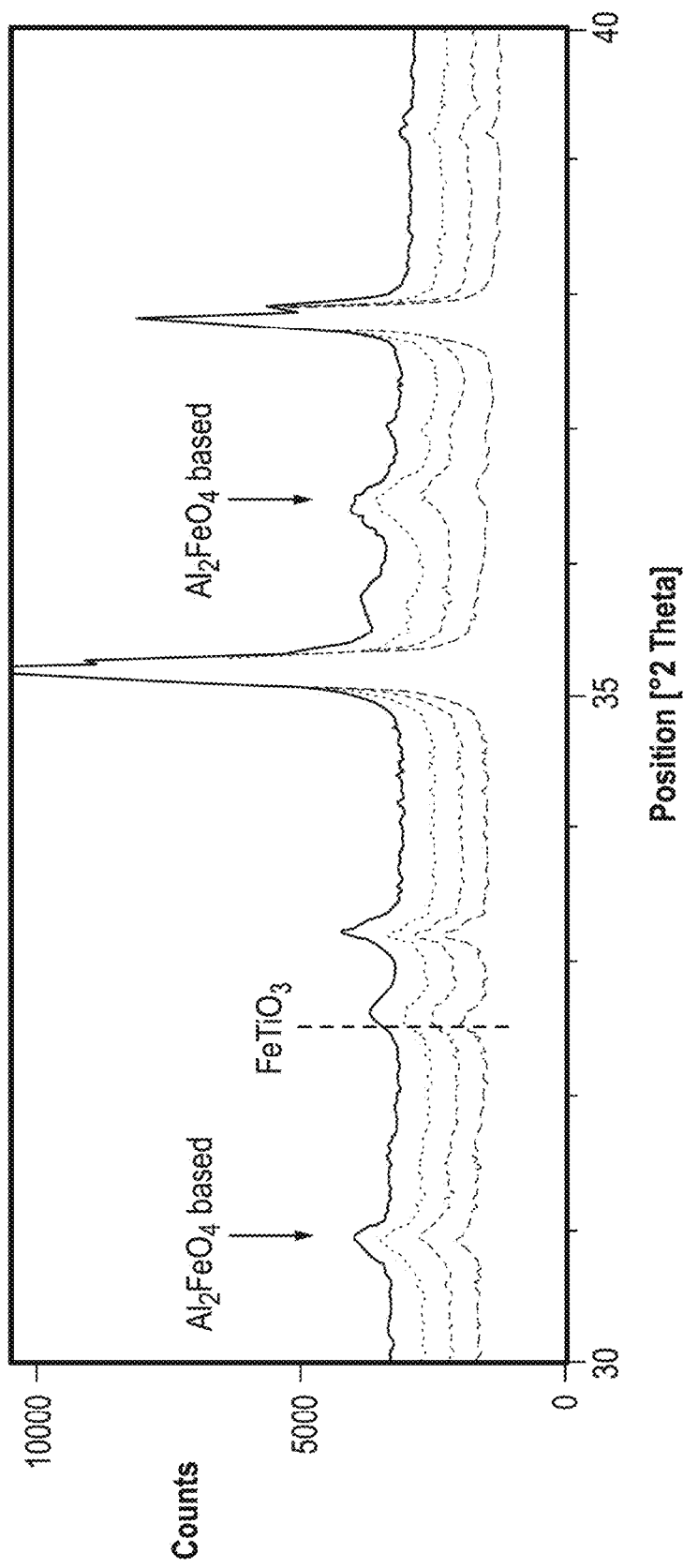
FIGS. 18 and 19 include an analysis of spectra of black alumina, both with and without heat treatment, at various temperatures.
Figure 19:
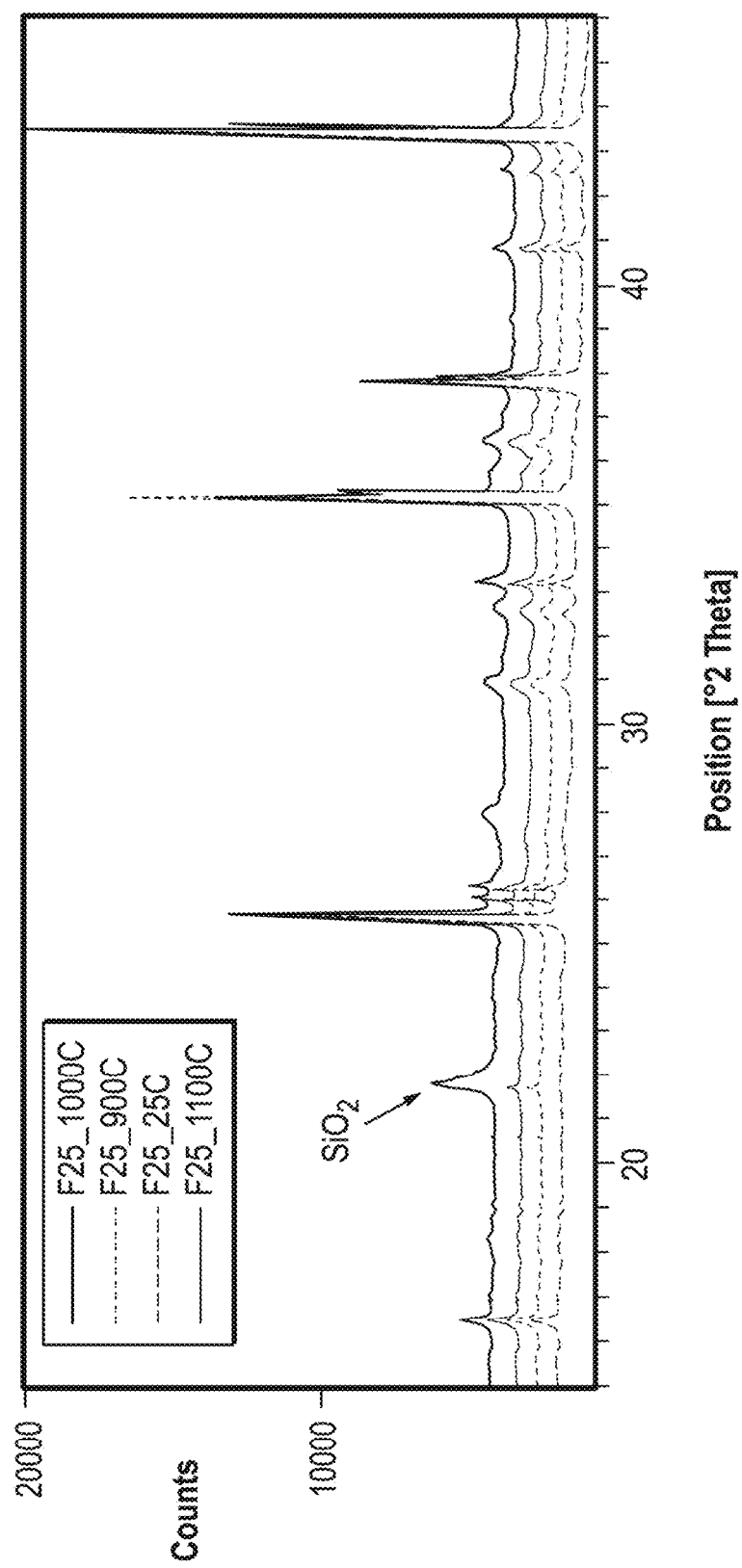

FIGS. 18 and 19 include analysis of x-ray diffraction (XRD) spectra of black alumina, both with and without heat treatment, at various temperatures. When heat treatment temperature is above 900° C., it is observed from XRD that the phase transformation occurs (from the secondary or minor phases) and the crystalline silica phase appears. In addition, the main phase of the black alumina grains remains as $Al_2O_3$. For example, FIG. 19 indicates that crystalline silica will come out of the black alumina when the heat treatment temperature exceeds about 900° C.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A cutting wheel comprising:
   a body including:
      a bond material comprising at least about 31 vol % of a total volume of the body;
      abrasive particles contained within the bond material, the abrasive particles including black alumina, wherein at least about 25 vol % and no greater than 99 vol % of a total volume of the abrasive particles includes black alumina and wherein the abrasive particles include a second type of abrasive particle selected from the group consisting of white fused alumina and zirconia.

2. The cutting wheel of claim 1, wherein at least about 30 vol % of the total volume of the abrasive particles includes black alumina.

3. The cutting wheel of claim 1, wherein an average particle size of the abrasive particles is at least about 0.34 mm and not greater than about 1.16 mm.

4. The cutting wheel of claim 1, wherein the body has a ratio of outer diameter to thickness within a range between about 125:1 to about 15:1.

5. The cutting wheel of claim 1, wherein the abrasive particles have an average aspect ratio of no greater than about 5:1.

6. The cutting wheel of claim 1, wherein the bond material is at least about 20 wt % of the body.

7. The cutting wheel of claim 1, wherein at least about 38 wt % of a total weight of the abrasive particles includes the abrasive particles, and no greater than about 81 wt % of a total weight of the abrasive particles includes black alumina.

8. The cutting wheel of claim 1, wherein the abrasive particles have an average density of no greater than about 3.9 g/cm$^3$, and at least about 3.0 g/cm$^3$.

9. The cutting wheel of claim 1, wherein the black alumina has a Vickers Hardness within a range of about 1870 to about 2450.

10. The cutting wheel of claim 1, wherein the black alumina has a ball mill toughness of at least about 38%, and no greater than about 50%.

11. The cutting wheel of claim 1, wherein the black alumina is heat treated to a temperature of at least about 800° C., and not greater than about 1100° C.

12. The cutting wheel of claim 1, wherein the body comprises:
  31-33 vol % bond material for a total volume of the body;
  7-8.2 vol % of a pyrite material for a total volume of the body;
  6-25 vol % porosity for a total volume of the body;
  28-32 vol % brown fused alumina for a total volume of abrasive particles; and
  68-72 vol % black alumina for a total volume of abrasive particles.

13. The cutting wheel of claim 1, wherein the body comprises:
  33-36 vol % bond material for a total volume of the body;
  8.3-9 vol % of a pyrite material for a total volume of the body;
  6-25 vol % porosity for a total volume of the body;
  28-32 vol % brown fused alumina for a total volume of abrasive particles; and
  68-72 vol % black alumina for a total volume of abrasive particles.

14. The cutting wheel of claim 1, wherein the body comprises:
  36-38 vol % bond material for a total volume of the body;
  9-10 vol % of a pyrite material for a total volume of the body;
  6-25 vol % porosity for a total volume of the body;
  28-32 vol % brown fused alumina for a total volume of abrasive particles; and
  68-72 vol % black alumina for a total volume of abrasive particles.

15. The cutting wheel of claim 1, wherein the body comprises 14-25 vol % porosity for a total volume of the body.

16. The cutting wheel of claim 1, wherein the body comprises 6-10 vol % of a pyrite material for a total volume of the body.

17. The cutting wheel of claim 1, wherein the body comprises 14-25 vol % porosity for a total volume of the body.

18. The cutting wheel of claim 1, wherein the body comprises 28-32 vol % brown fused alumina for a total volume of abrasive particles.

19. The cutting wheel of claim 1, wherein the body comprises 68-72 vol % black alumina for a total volume of abrasive particles.

20. The cutting wheel of claim 1, wherein the body comprises no greater than 99 vol % of a total volume of the abrasive particles includes black alumina.

* * * * *